US012650135B2

(12) United States Patent
Bruck et al.

(10) Patent No.: US 12,650,135 B2
(45) Date of Patent: Jun. 9, 2026

(54) VOLUME FOLLOW SUPPLY

(71) Applicant: HYDAC Fluidtechnik GmbH, Sulzbach / Saar (DE)

(72) Inventors: Peter Bruck, Althornbach (DE); Tobias Dohmen, Lebach (DE)

(73) Assignee: HYDAC FLUIDTECHNIK GMBH, Sulzbach/Saar (DE)

( * ) Notice: Subject to any disclaimer, the term of this patent is extended or adjusted under 35 U.S.C. 154(b) by 0 days.

(21) Appl. No.: 18/875,536

(22) PCT Filed: Apr. 26, 2023

(86) PCT No.: PCT/EP2023/060998
§ 371 (c)(1),
(2) Date: Dec. 16, 2024

(87) PCT Pub. No.: WO2023/241843
PCT Pub. Date: Dec. 21, 2023

(65) Prior Publication Data

US 2025/0369458 A1 Dec. 4, 2025

(30) Foreign Application Priority Data

Jun. 17, 2022 (DE) ..................... 10 2022 002 192.7

(51) Int. Cl.
*F15B 11/16* (2006.01)
*F15B 21/08* (2006.01)

(52) U.S. Cl.
CPC ............. *F15B 11/165* (2013.01); *F15B 21/08* (2013.01); *F15B 2211/20515* (2013.01);
(Continued)

(58) Field of Classification Search
CPC .......... F15B 11/165; F15B 2211/20515; F15B 2211/20538; F15B 2211/275; F15B 2211/45
See application file for complete search history.

(56) References Cited

U.S. PATENT DOCUMENTS 4,523,431 A 6/1985 Budzich
5,873,245 A * 2/1999 Kato ..................... E02F 9/2225 60/452
(Continued)

FOREIGN PATENT DOCUMENTS

DE 102009034212 A1 2/2011
DE 102013017093 A1 4/2015 ............. F15B 13/00
(Continued)

OTHER PUBLICATIONS

Search Report for International Application No. PCT/EP2023/060998, 4 pages, Jul. 13, 2023.

*Primary Examiner* — Matthew Wiblin
(74) *Attorney, Agent, or Firm* — Slayden Grubert Beard PLLC

(57) ABSTRACT

The disclosure relates to a volume flow supply, in particular for closed center LS systems, comprising a pressure supply device and a pressure balance as components of a supply system for supplying fluid of a load which can be hydraulically connected to the supply system. The pressure supply device provides a volume flow when required in order to supply the hydraulic load in that the pressure balance is made of a circulation pressure balance which discharges a possible surplus volume flow out of the supply flow. The volume flow supply also comprises a controller which reduces the surplus volume flow to a minimum by actuating the pressure supply device.

16 Claims, 11 Drawing Sheets

(52) U.S. Cl.
CPC ............... *F15B 2211/20538* (2013.01); *F15B 2211/275* (2013.01); *F15B 2211/41563* (2013.01); *F15B 2211/45* (2013.01)

(56) References Cited

U.S. PATENT DOCUMENTS

| | | | | |
|---|---|---|---|---|
| 10,119,558 | B2 | 11/2018 | Biwersi et al. | |
| 2012/0199765 | A1 * | 8/2012 | Hilzendegen ........... | F15B 11/05<br>137/596.14 |
| 2014/0227104 | A1 * | 8/2014 | Takahashi ............... | E02F 9/207<br>417/42 |
| 2024/0209873 | A1 * | 6/2024 | Franzoni ............... | E02F 9/2228 |

FOREIGN PATENT DOCUMENTS

| | | | | |
|---|---|---|---|---|
| DE | 102020215437 | B3 | 5/2022 | .............. F04B 49/06 |
| DE | 102012110978 | B4 | 2/2024 | .............. F15B 11/16 |
| WO | 2023277994 | A1 | 1/2023 | |

* cited by examiner

VOLUME FOLLOW SUPPLY

CROSS-REFERENCE TO RELATED APPLICATIONS

This application claims priority to German Patent Application DE 10 2022 002 192.7, filed on Jun. 17, 2022 with the German Patent and Trademark Office. The contents of the aforesaid Patent Application are incorporated herein for all purposes.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

The disclosure relates to a volume flow supply, in particular for closed centre LS systems, comprising a pressure supply device and a pressure balance as components of a supply system for supplying fluid for a hydraulic consumer that can be connected thereto.

A valve assembly is known from DE 10 2009 049 548 A1 for pressure regulation of a pressure medium by a pressure medium pump to at least one first consumer, comprising a pilot-operated pressure control valve having a main piston to which the pressure medium is applied, and a pilot piston, it being possible for a pressure chamber between a rear piston side of the main piston and the pilot piston to be relieved of pressure, a release valve being fluidically connected to the pressure chamber, said release valve opening in the event of pressure by the pressure medium on the load tap LS, which represents a non-operational position of the consumer, and returns pressure medium at low pressure into a pressure medium container or to the pressure medium pump, and the release valve closing when the pressure medium pressure on the load tap LS represents operation of the consumer.

In this way, a valve assembly for pressure regulation of a pressure medium is provided, which allows for further minimisation of the pressure loss when no consumer is connected. In this way, a substantial reduction of the pressure losses of the valve assembly is achieved, compared with known circuits having circulation pressure balances.

A control device is known from DE 10 2013 017 093 A1, in particular for the hydraulic actuation of components of mobile work machines, consisting of at least one pressure supply port and one tank or return port, as well as two utility ports and control and/or regulating valves connected between the individual ports, and comprising two control lines which can actuate at least one of the control and/or regulating valves, wherein a modularly constructed functional block is connected to at least one of the control lines. In the case of a suitable design of the modularly constructed functional block, a plurality of further embodiments of the control devices can be conceptually revised, and in this way functional reliability can also be routinely increased.

SUMMARY

A need exists to improve a known solution, while maintaining one or more of their benefits.

The need is addressed by the subject matter of the independent claim(s). Embodiments of the invention are described in the dependent claims, the following description, and the drawings.

DESCRIPTION

Figure 1:
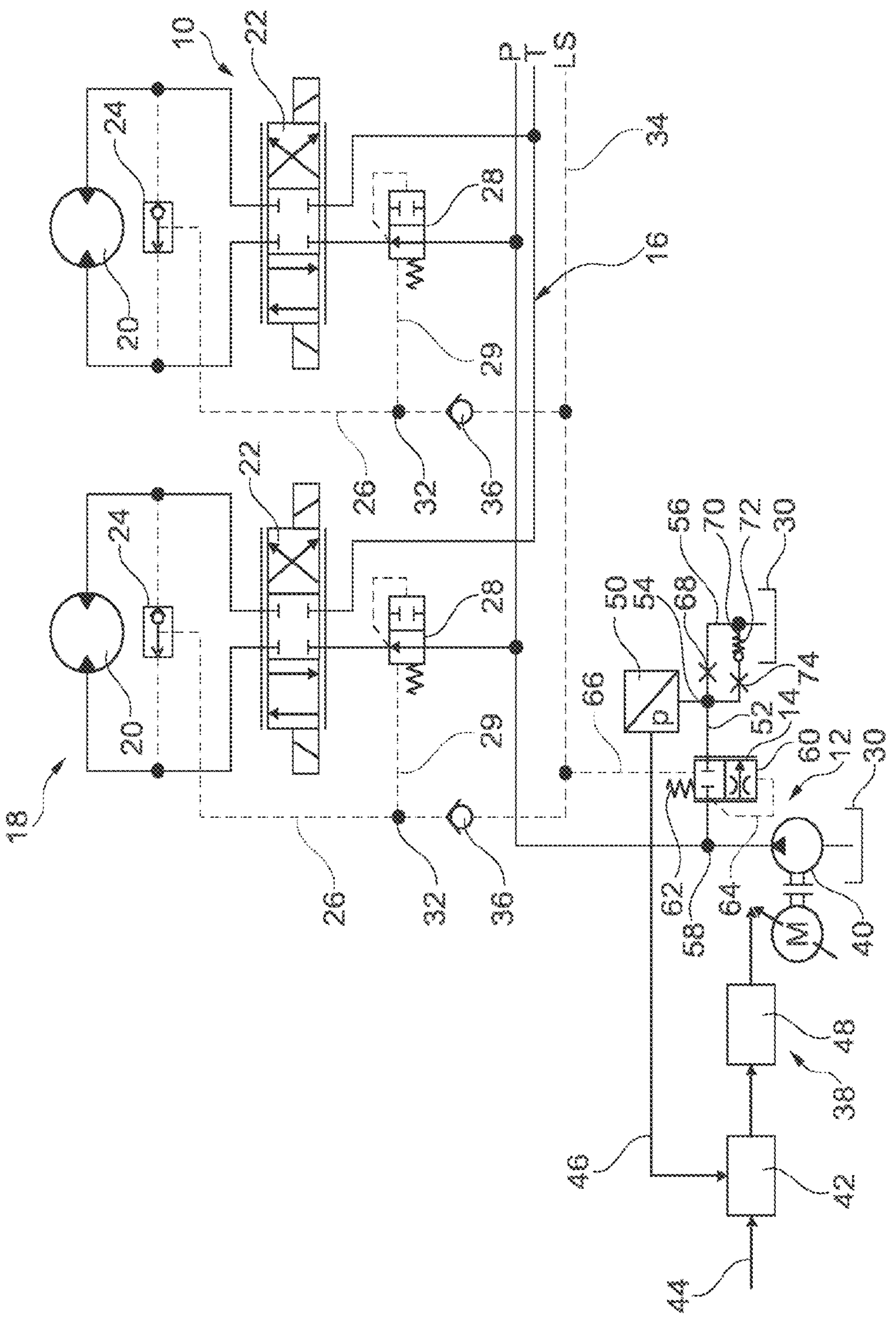
FIG. 1 shows an embodiment of a volume flow supply.

The details of one or more embodiments are set forth in the accompanying drawings and the description below. Other features will be apparent from the description, drawings, and from the claims.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

In some embodiments, the pressure supply device provides a volume flow when required in order to supply the hydraulic consumer in that the pressure balance is formed by a circulation pressure balance which discharges a possible surplus volume flow out of the supply flow and comprises a controller which reduces the surplus volume flow to a minimum by actuating the pressure supply device. A structurally simple, cost-effective, robust and requirement-oriented volume flow supply is provided for hydraulic systems, such as closed centre LS systems. Such a requirement-oriented volume flow supply on the one hand promotes system stability, in the case of surplus supply; on the other hand, the associated surplus volume flow causes hydraulic losses, which should be prevented. The solution according to the teachings herein makes it possible, by means of the controller, to provide volume flow when required for the respectively connected hydraulic consumer, a possible surplus volume flow being discharged via the circulation pressure balance such that the associated losses can be reduced to a necessary minimum. The pressure balance or circulation pressure balance used in each case can be integrated with the orifice or measuring orifice for example used in each case, in a main control block.

In this case, it is beneficially provided that the pressure supply device comprises a variable-speed hydraulic pump which is driven by a variable-speed motor that is controlled by the controller. The losses resulting from the surplus volume flow can be reduced by the requirement-oriented controller to a minimum required for system stability.

In some embodiments, it is provided that the controller comprises a regulator having a specifiable command variable, for example in the form of a PID controller, the control variable of which is formed by output values of a sensor which, designed as a pressure sensor, acquires pressure values on the outlet side of the circulation pressure balance, and/or, designed as a path sensor, acquires the movement position of the valve slider of the circulation pressure balance. In this case, a measuring orifice is for example arranged downstream of the circulation pressure balance, via which measuring orifice the fluid flows to the tank or return port and thus to a storage tank. The pressure difference over the measuring orifice can be acquired by a pressure sensor, the signal of the pressure sensor serving as a control variable or actual value for the control circuit, which is configured as a closed loop in this respect. The controller then adjusts the speed of the hydraulic pump in such a way that, ideally, the control variable corresponds to the command variable or the target value.

Accordingly, the controller proposed here adjusts a constant Δp over the measuring orifice, such that, within the control range ($n<n_{max}$) of the hydraulic pump, a continuous surplus volume flow flows over the circulation pressure balance. The system is accordingly in surplus supply and operates at a stable operating point. The losses resulting from the surplus volume flow can be reduced by the controller, which operates when required, to a minimum required for system stability. The supply system designed in this way requires just one single pressure sensor and furthermore the acquired pressure before the measuring orifice is independent of the load or the load pressure/pump pressure. A further benefit is the comparatively low pressure level of the measuring orifice, compared with the load-dependent pressures, such that the pressure range to be acquired by the sensor is smaller, and thus the resolution of the pressure range is higher. Since in this respect the sensor accuracy can be reduced, this results in a cost benefit.

The measuring orifice has a damping effect, and the measured variable is independent of the load on the hydraulic consumer. This has a positive effect on the signal quality of the sensor and improves the control quality. Optionally, smoothing of the signal can be omitted, which again improves the response characteristic. The circulation pressure balance can have smaller dimensions, since in control operation only a small surplus volume flow has to be discharged.

It is furthermore possible, alternatively or in addition, to equip the circulation pressure balance with a measuring system by means of which the slide position of the circulation pressure balance is acquired. In this case, the signal of the slide position serves as a control variable (actual value) for the control circuit, designed as a closed loop. The controller then adjusts the speed for the hydraulic pump in such a way that, ideally, the control variable again corresponds to the command variable (target value). Correspondingly, the controller proposed here adjusts a constant slide position which, in the case of a nominal pressure to be defined, corresponds to a desired surplus volume flow over the circulation pressure balance. The system is accordingly again in surplus supply and operates at a stable operating point. Furthermore, here too, the remaining benefits are as disclosed for the pressure sensor solution. The controller proposed here adjusts a constant slide position which corresponds to the desired pressure difference $\Delta p_{LS}$. The slide position corresponds to the opening point of the circulation pressure balance. In this way, early detection is possible when the circulation pressure balance "goes into control".

The surplus volume flow is load-dependent in the case of a constant slide position, and correspondingly is greater in the case of higher load pressures than in the case of lower pressures. Possibilities for reducing or preventing this effect are to provide a large fine-tuning region in the case of the circulation pressure balance, or additionally or alternatively to use the pressure sensor solution for further compensation within the controller.

In some embodiments, it is provided that a bypass line is present, connected in parallel with the aforementioned measuring orifice, said bypass line for example comprising at least one spring-loaded non-return valve which opens in the direction of a tank or return line. In this way, in particular in the case of high surplus volume flows, e.g. in standby operation, the pressure difference over the measuring orifice can be limited. This kind of standby operation results if no consumer is actuated and the hydraulic pump conveys a volume flow $Q_{min}$ on account of a minimum speed. The opening pressure of the non-return valve in the bypass must be above the command variable. Thus, in standby operation, the circulating pressure is limited and contributes to an energy-efficient operation of the pressure supply device. Furthermore, limiting the pressure protects the pressure sensor against overload pressure. In some embodiments, it is provided that at least one further measuring orifice is connected in parallel with the one measuring orifice and for example in front of the non-return valve viewed in the flow direction, for example the free cross-section of the further measuring orifice being larger than that of the one measuring orifice. In this way, a fine-tuning region can be achieved and a flow passes through the further measuring orifice only if the opening pressure of the bypass non-return valve is exceeded. This point can be identified by a kink in the volume flow/pressure graph. Furthermore, an additional bypass can be provided, e.g. via a non-return valve, for the one and the other measuring orifice. The opening pressure of the bypass non-return valve for the one measuring orifice and the further measuring orifice then lies above the bypass non-return valve for the one measuring orifice. This again results in a change in the volume flow/pressure graph. The detection range of the sensors used is extended by the aforementioned fine-tuning region. Moreover, further system interventions are conceivable, e.g. that a valve or are switched (electrically or a plurality of valves hydraulically/mechanically) above a certain pressure over the measuring orifices.

Furthermore, the disclosure also relates to a method for carrying out a requirement-oriented volume flow supply, in particular for closed centre LS systems, using the supply device set out above.

Reference will now be made to the drawings in which the various elements of embodiments will be given numerical designations and in which further embodiments will be discussed.

Specific references to components, process steps, and other elements are not intended to be limiting. Further, it is understood that like parts bear the same or similar reference numerals when referring to alternate FIGS. The drawings are schematic and not necessarily to scale.

FIG. 1 shows, in the manner of a hydraulic circuit diagram, a volume flow supply, in particular for what are known as closed centre LS systems, such a system being referred to in its entirety as 10 in FIG. 1. Such a system 10 is also referred to in technical jargon as LS-MCV (Main Control Valve). Furthermore, the volume flow supply comprises a pressure supply device, referred to in its entirety as 12, and what is known as a circulation pressure balance 14 (also referred to herein as 'bypass pressure regulator valve') as a pressure balance (i.e., pressure compensator). The pressure supply device 12 and the circulation pressure balance 14 are components of a supply system, referred to in its entirety as 16, for supplying fluid to a hydraulic consumer, referred to in its entirety as 18, which can be connected thereto.

The hydraulic consumer 18 comprises two hydraulic motors 20 having two possible flow directions. The respective hydraulic motor 20 is manifestly actuated by an electrically actuatable proportional 4/3-way valve 22. By means of the shuttle valve 24 shown, between the assignable hydraulic motor 20 and the proportional valve 22, the respective higher pressure in the supply to the hydraulic motor 20 is reported to an LS (load-sensing) line 26, and a 2/2-way valve 28 is switched to this line with its control line 29. The respective valve 28 is assigned a pressure-limiting function 74 in the open switching position shown, respect the respective valve 28 establishes a fluidic connection between a pressure supply line P and an inlet of the respective valve 22. The other inlet of the valve 22 is switched to the tank or return line T, which leads to a storage tank 30 that may also consist of a plurality of tank components. The opposing outlets of the respective proportional valve 22 are routed to the actuation sides of the associated hydraulic motor 20. Behind a branch point 32, into which the assignable control line 29 of the directional valve 28 leads, a non-return valve 36 is connected, in the direction of a central load-sensing (LS) line 34, which opens in the direction of the central LS line 34 and is held in its closed position in the opposite direction.

The pressure supply device 12 for supplying the hydraulic consumer 18 provides this with volume flow when required, in that the circulation pressure balance 14 discharges a possible surplus volume flow from the supply flow which is provided by the pressure supply device 12 in the pressure supply line P. Furthermore, a controller, referred to in its entirety as 28, is provided, which helps to reduce the surplus volume flow to a minimum by actuating the aforementioned pressure supply device 12.

As also shown in FIG. 1, the pressure supply device 12 comprises a variable-speed hydraulic pump 40, for example in the form of a fixed displacement pump, which is driven by a variable-speed motor M, for example in the form of an electric motor, which is in turn actuated by the controller 38. The controller 38 comprises a regulator 42, for example in the form of a PID controller. The regulator 42 has a command variable 44 and a control variable 46 on the inlet side. In this respect, the command variable 44 constitutes the target value and the control variable 46 constitutes the respective actual value. On the outlet side, the regulator 42 is connected to a motor control unit 48, for example in the form of a frequency inverter, which specifies, as the controlled variable, the required speed for the electric motor M and thus sets the respective discharge amount of the hydraulic pump 40 in a speed-controlled manner, this amount being collected by the pump from the storage tank 30 and fed into the pressure supply line P.

The aforementioned control variable 46 is formed by output values of a pressure sensor 50. Said pressure sensor 50 acquires pressure values on the outlet side 52 of the circulation pressure balance 14, for which purpose the pressure sensor 50 is connected to a branch point 54 which leads to the storage tank 30 via a further tank or return line 56.

The circulation pressure balance 14 is connected, on the inlet side, to the pressure supply line P, and specifically via a further branch point 58 which is arranged directly at the outlet of the hydraulic pump 40. The circulation pressure balance 14 is designed in a slide construction as a directly controlled, spring-loaded throttle valve, the valve slider 60 of which is subjected on one side, together with an energy accumulator, such as a compression spring 62, to an LS pressure, by the consumer 18, and on the other side is subjected to a control pressure via a control line 64 a control pressure, which corresponds to the output or supply pressure of the pressure supply device 12, i.e. the respective output pressure of the hydraulic pump 40. The aforementioned LS pressure is conducted via an LS control line 66 from the central LS line 34 to the one control side of the circulation pressure balance 14.

Such circulation pressure balances 14 in a slide design can, as shown, be designed to be directly controlled and to have an integrated pressure-limiting function, for example as a screw-in valve, and can be sourced from the proprietor, by way of example under order number DWM12121ZD. Such pressure balances 14 offer infinitely variable control and, as shown in FIG. 1, are closed in the normal position. The purpose of such a pressure balance 14 is to maintain a constant set volume flow, irrespective of pressure fluctuations. As a control valve, in combination with the compression spring 62, it holds the pressure gradient over the integrated measuring throttle, and thus the closure to the consumer 18 at the same level, in a requirement-oriented manner. Thus, when the measuring throttle surface is the same, the volume flow remains the same. If, in load-sensing systems 10, the load pressure drops to tank pressure, in that all the consumers 20 are relieved of pressure to the tank, the pressure balance 14 also opens over the internal measuring throttle to the storage tank 30. In this way, a circulation pressure balance 14 of this kind can be used, for example when lifting variable loads or for driving a hydraulic motor 20 at the same speed in each case. Instead of the directly controlled circulation pressure balance 14, when implementing the circuit solution according to FIG. 1, alternatively a pilot-operated pressure balance can also be used, which will be explained in more detail in the following.

A measuring orifice 68 adjoins the outlet side 52, as shown, of the circulation balance 14, said orifice being connected behind the branch point 54 into the tank or return line 56 in the direction of the storage tank 30. In this case, a spring-loaded non-return valve 72 is connected in parallel with the measuring orifice 68, in a branch line 70, said valve opening in the direction of the storage tank 30.

In some embodiments, it can furthermore be provided that a further measuring orifice 74 having a larger cross-section than the first measuring orifice 68 is connected into the branch line 70 in parallel with the first measuring orifice 68 and in front of the non-return valve 72 in the flow direction. However, such a design is not compulsory. In particular, the further measuring orifice 74 can also be arranged behind the non-return valve 72:

A resulting surplus volume flow is discharged out of the system 10 via the circulation pressure balance 14 such that the one measuring orifice 68, via which the fluid flows to the storage tank 30, is arranged downstream of the circulation pressure balance 14. The pressure difference over said measuring orifice 68 is acquired by the pressure sensor 50 and the signal of said pressure sensor 50 serves as a control variable (actual value) 46 for the control circuit, configured as a closed loop, as the controller 38. Said controller 38 adjusts the speed of the hydraulic pump 40 in such a way that, ideally, the control variable 46, as the actual value, corresponds to the command variable 44, as the target value.

Accordingly, the controller proposed here, according to FIG. 1, adjusts a constant Δp over the one measuring orifice 68, such that within the control range, in which the current speed is in any case lower than the maximum speed of the hydraulic pump 40, a continuous surplus volume flow flows over the circulation pressure balance 14. The supply system is accordingly in surplus supply and operates at a stable operating point, while at the same time the surplus volume flow required for system stability is reduced to a necessary minimum, such that hydraulic losses are prevented in the context of the supply. In this way, a compromise is achieved between system stability and loss prevention.

The use of the second measuring orifice 74, the free cross-section of which is for example larger than that of the first measuring orifice 68, makes it possible to achieve a fine-tuning region and to extend the detection region of the sensors by means of the pressure sensor 50.

A variable-speed unit, in particular in the form of a fixed displacement pump as the hydraulic pump 40, makes it possible to provide a volume flow when required, such that the surplus volume flow via the circulation pressure balance 14, and the associated losses, are reduced to a necessary minimum. Accordingly a surplus volume flow is discharged out of the system via the circulation pressure balance 14 such that at least one measuring orifice 68, via which the fluid flows to the tank 30, is arranged downstream of the circulation pressure balance 14. The pressure difference over the measuring orifice 68 ($p_T = p_U = 0$ bar) is acquired by a pressure sensor 50. The signal of the pressure sensor 50 serves as a control variable (actual value) for a closed-loop control circuit. The controller adjusts the speed of the unit in such a way that, ideally, the control variable corresponds to the command variable (target value).

Accordingly, the controller proposed here adjusts a constant Δp over the measuring orifice 68, which cannot be equated with $\Delta_{PLS}$, such that within the control range ($n < n_{max,\ unit}$) a continuous surplus volume flow flows over the circulation pressure balance 14. The system is accordingly in surplus supply and operates at a stable operating point.

The losses resulting from the surplus volume flow can be reduced by the requirement-oriented controller to a minimum required for system stability.

The system requires just one pressure sensor 50, whereas what are known as eLS systems generally require at least two load-dependent sensor values, one in the form of a pump pressure and one in the form of an LS pressure. Furthermore, the acquired pressure before the measuring orifice 68 is independent of the load or the load pressure/pump pressure. A further benefit is the comparatively low pressure level of the measuring orifice 68 (anticipated to be less than 10 bar, depending on the orifice design), compared with the load-dependent pressures with pressure ranges of 250/350 bar, such that the pressure range of the sensor is smaller, and thus the resolution of the pressure range is higher. Accordingly, the sensor accuracy can be reduced, which is associated with a cost benefit. The respective measuring orifice 68 has a damping effect, and the measured variable is independent of the load. This has a positive effect on the signal quality of the sensor 50 and improves the control quality. Optionally, smoothing of the signal can be omitted, which improves the response characteristic.

Overall, the circulation pressure balance 14 can have smaller dimensions, since in control operation only a small surplus volume flow needs to be discharged.

In addition, in the embodiment according to FIG. 1, a bypass valve/non-return valve 72 having an upstream further measuring orifice 74 is arranged in parallel with the measuring orifice 68, in order to limit the pressure difference over the measuring orifice 68 in the case of a high surplus volume flow, e.g. in standby operation. In such standby operation, no consumer is actuated and the unit delivers a volume flow $Q_{min,\ unit}$ on account of a minimum speed. The opening pressure of the non-return valve 72 in the bypass must be above the command variable. Thus, in standby operation, the circulating pressure is limited and contributes to energy-efficient operation of the unit. Furthermore, limiting the pressure protects the sensor 50 against overload pressure.

Figure 3:
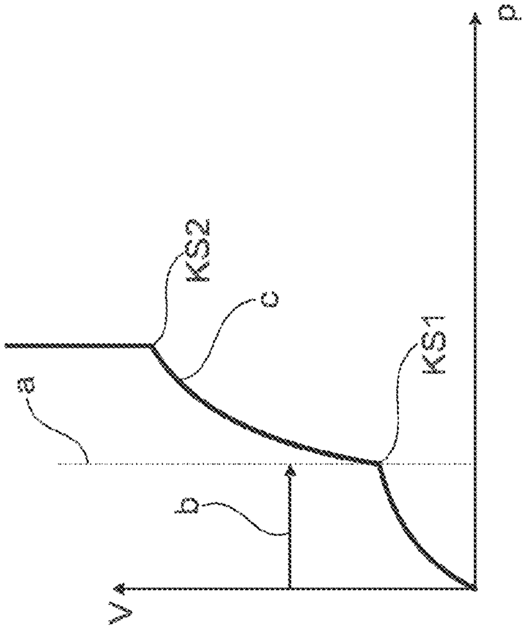
FIGS. 2, 3 show two example volume flow graphs.
Figure 2:
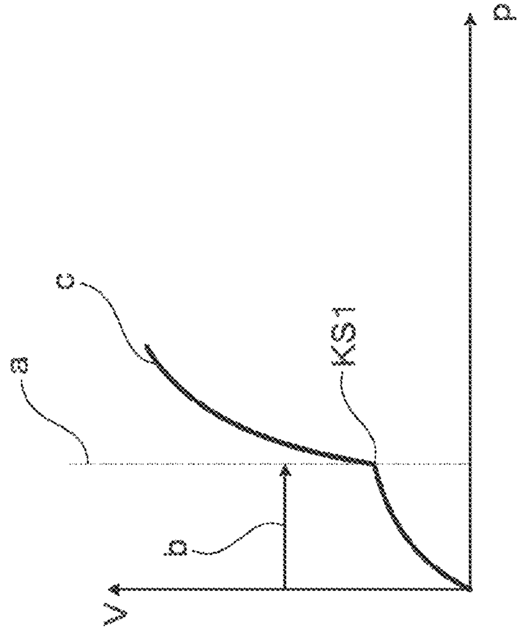

FIGS. 2 and 3 show in graph form, for the solution according to FIG. 1, the volume flow V over the pressure p at the measuring orifice 68 as a control variable. In this case, a represents the opening pressure "bypass of measuring orifice 68 via non-return valve 72". Furthermore, b denotes the fine-tuning region, and c the surplus volume flow. The kink point KS 1 after leaving the fine-tuning region b is characteristic.

A further second kink point KS 2 is visible in the graph according to FIG. 3, for the event that, as shown in the solution according to FIG. 1, a bypass having a further measuring orifice 74 is present, in addition to the first measuring orifice 68. In this way, a fine-tuning region b as in FIG. 1 can be achieved and a flow passes through the further measuring orifice 74 only if the opening pressure of the bypass non-return valve 72 is exceeded.

Accordingly, the fine-tuning region b is only reached in that a further orifice or measuring orifice 74, which for example has larger dimensions than the first measuring orifice 68, is arranged in front of or behind the bypass valve or non-return valve 72 of the measuring orifice 68. A flow passes through the measuring orifice 74 only if the opening pressure of the bypass valve or non-return valve 72 is exceeded, and this point, as already shown in FIG. 3, is identifiable by the kink KS 2 in the volume flow/pressure graph. If the kink point KS 2 is reached, the pressure p over the measuring orifice 68 does not increase further; only the volume flow V continues to increase. In any case, the aforementioned fine-tuning region b extends the detection range of the sensors, in particular when a pressure sensor 50 is used.

Further system interventions are conceivable, for example that a valve or a plurality of valves are switched, whether electrically or hydraulically/mechanically, above a certain pressure via the measuring orifices 68, 74.

In the following, some embodiments are described in particular proceeding from the solution according to FIG. 1, but these embodiments are explained only as insofar they differ substantially from the embodiment according to FIG. 1. In this respect, too, for the following embodiments, the same reference numerals are used for the same components as for FIG. 1, and the statements made in this regard then also apply to the following embodiments.

Figure 4:
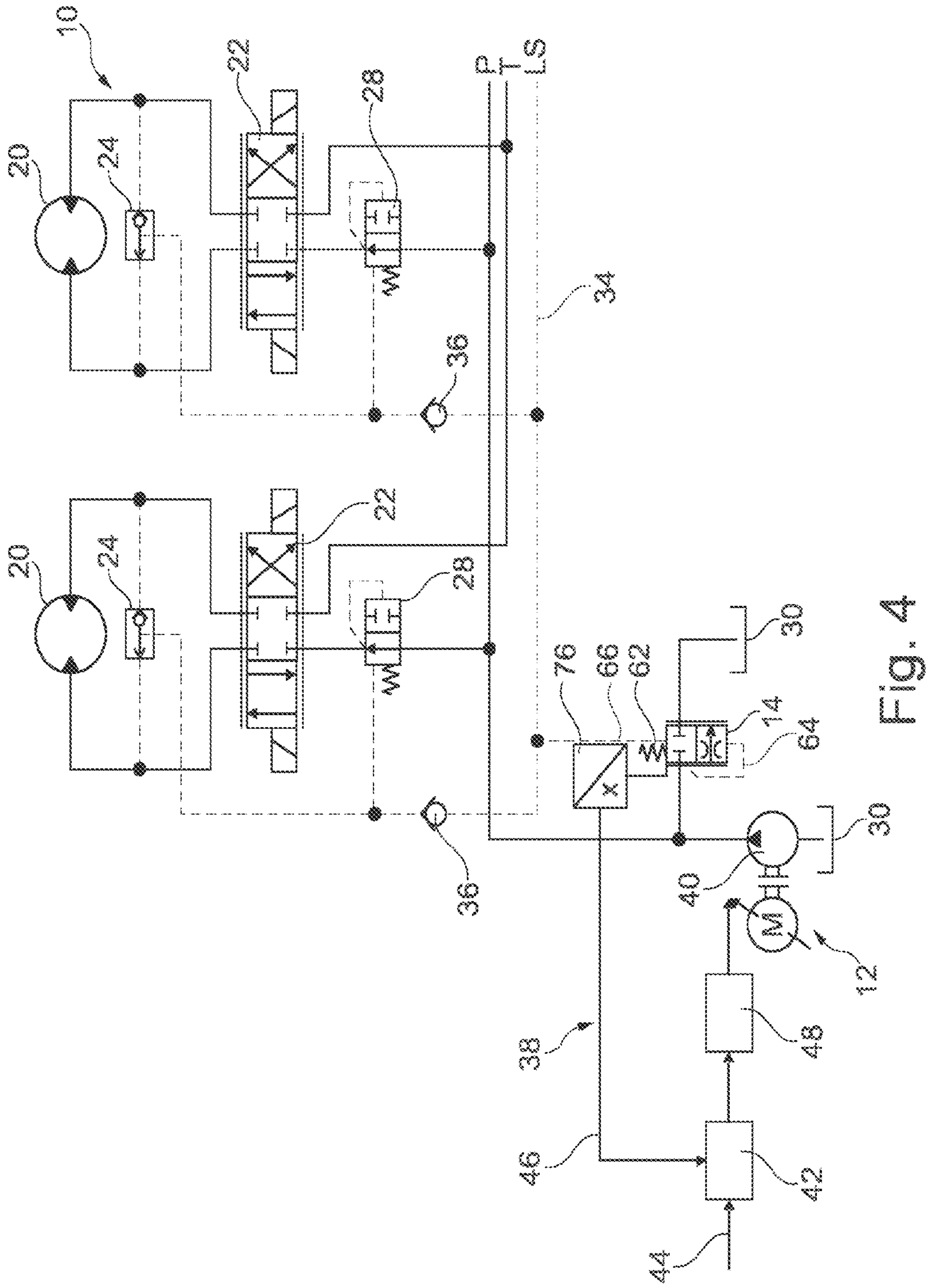
FIGS. 4-12 show embodiments that are different from FIG. 1.

The solution according to FIG. 4 is changed in that the circulation pressure balance 14 now comprises a path measurement system, in particular in the form of a path sensor 76, by means of which the position of the valve slider 60 is acquired in every control position of the circulation pressure balance 14. The signal of the slide position now serves as a control variable 46 and constitutes the respective actual value for the closed-loop control circuit in the form of the controller 38. This type of controller 38 adjusts the speed of the hydraulic pump 40 in such a way that, ideally, the control variable 46, as the actual value, again corresponds to the command variable 44, as the target value. Correspondingly, the controller 38 according to FIG. 4, proposed here, adjusts a constant slide position, and, in the case of a nominal pressure to be defined, said slide position corresponds to a desired surplus volume flow over the circulation pressure balance 14. The system is accordingly again in surplus supply and operates at a stable operating point, avoiding loss volumes. The surplus volume flow is load-dependent in the case of a constant slide position, and correspondingly the surplus volume flow is greater in the case of higher load pressures than in the case of lower pressures. Possibilities for reducing or entirely preventing this effect consist in providing a large fine-tuning region for the circulation pressure balance 14, or additionally using the pressure sensor 50 for compensation within the controller 38. The valve slider 60 for example has a positive coverage within the circulation pressure balance 14, in the case of an adjusted spring preload/spring stiffness of the compression spring 62. Furthermore, the additional measuring orifices 68 and 74 shown in FIG. 1, and the non-return valve 72 in a bypass line have been omitted, and the further tank or return line 56, as a branch, leads, on the outlet side, directly into the storage tank 30 for fluid.

Figure 5:
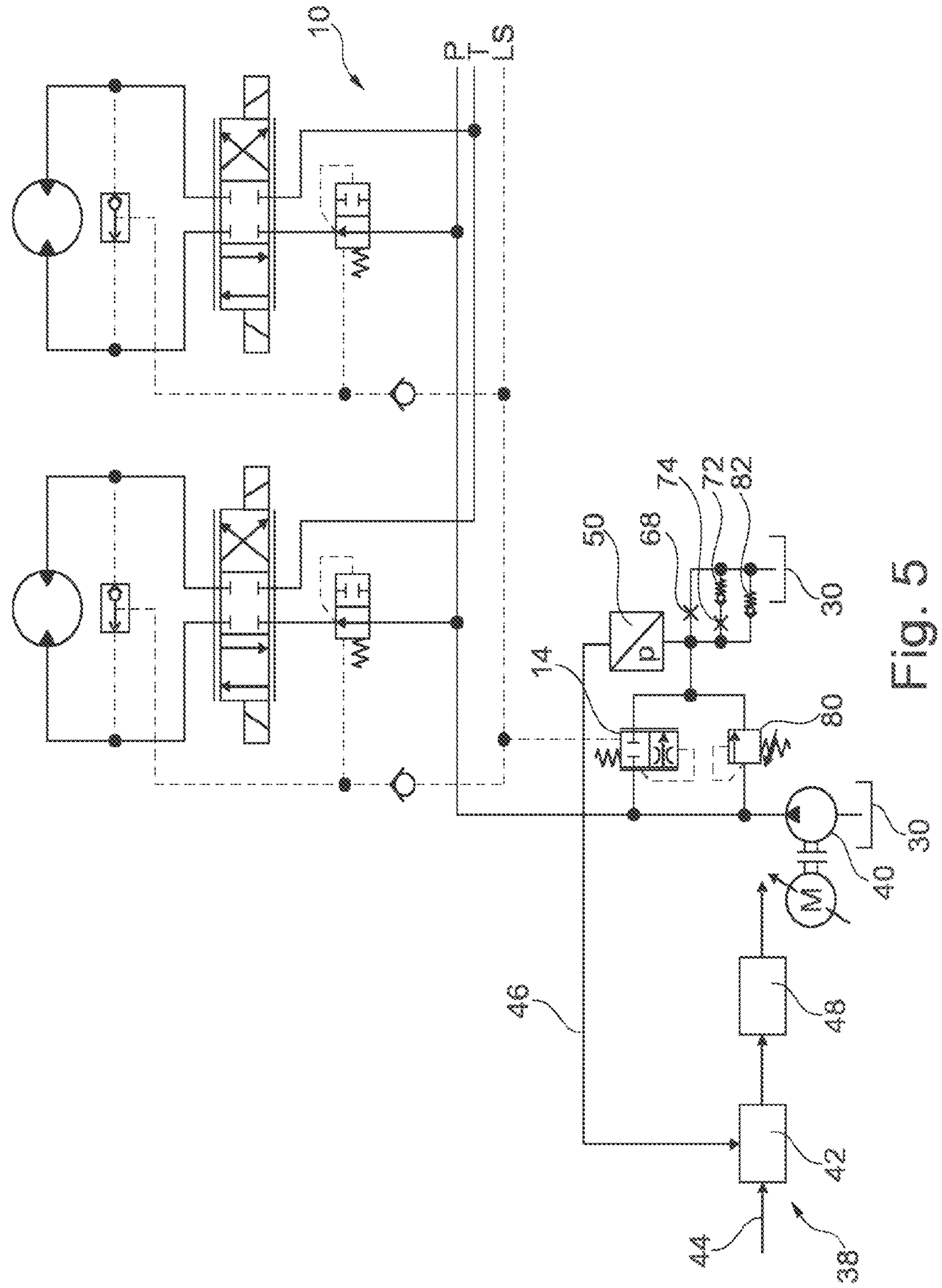

In the embodiment according to FIG. 5, in addition, a pressure-limiting valve 80 is arranged such that the volume flow discharged via the pressure-limiting valve 80 flows over the downstream measuring orifice 68 or measuring orifices 68, 74 to the tank 30. In the case of the set pressure value being exceeded, the pressure-limiting valve 80 opens mechanically; however, an electrical solution can also be implemented. This arrangement of the pressure-limiting valve 80 and the circulation pressure balance 14 facilitates a volume flow supply when required, with additional pressure cut-off, without using an additional pressure sensor or pressure switch, in order to acquire the pump/system pressure, to use it in the system, or to superimpose an additional pressure regulator for pressure cut-off on the requirement-oriented controller. In this case, the function of a pressure cut-off is as follows: the delivery volume flow of the respective unit is limited or reduced upon reaching a set pressure, equal to the setpoint of the pressure-limiting valve 80, in order to prevent an increased power loss in the system.

The pressure-limiting valve 80 is connected in parallel with the pressure balance 14 and fluidically connected to the pressure supply line of the hydraulic pump 40 and to the two measuring orifices 68 and 74. Furthermore, an additional non-return valve 82 is present in the bypass to the second measuring orifice 74 comprising the non-return valve 72, which opens towards the tank 30. In the case of the circuit diagram solution according to FIG. 5, a volume flow/pressure graph according to the illustration shown in FIG. 3 can be achieved.

Figure 6:
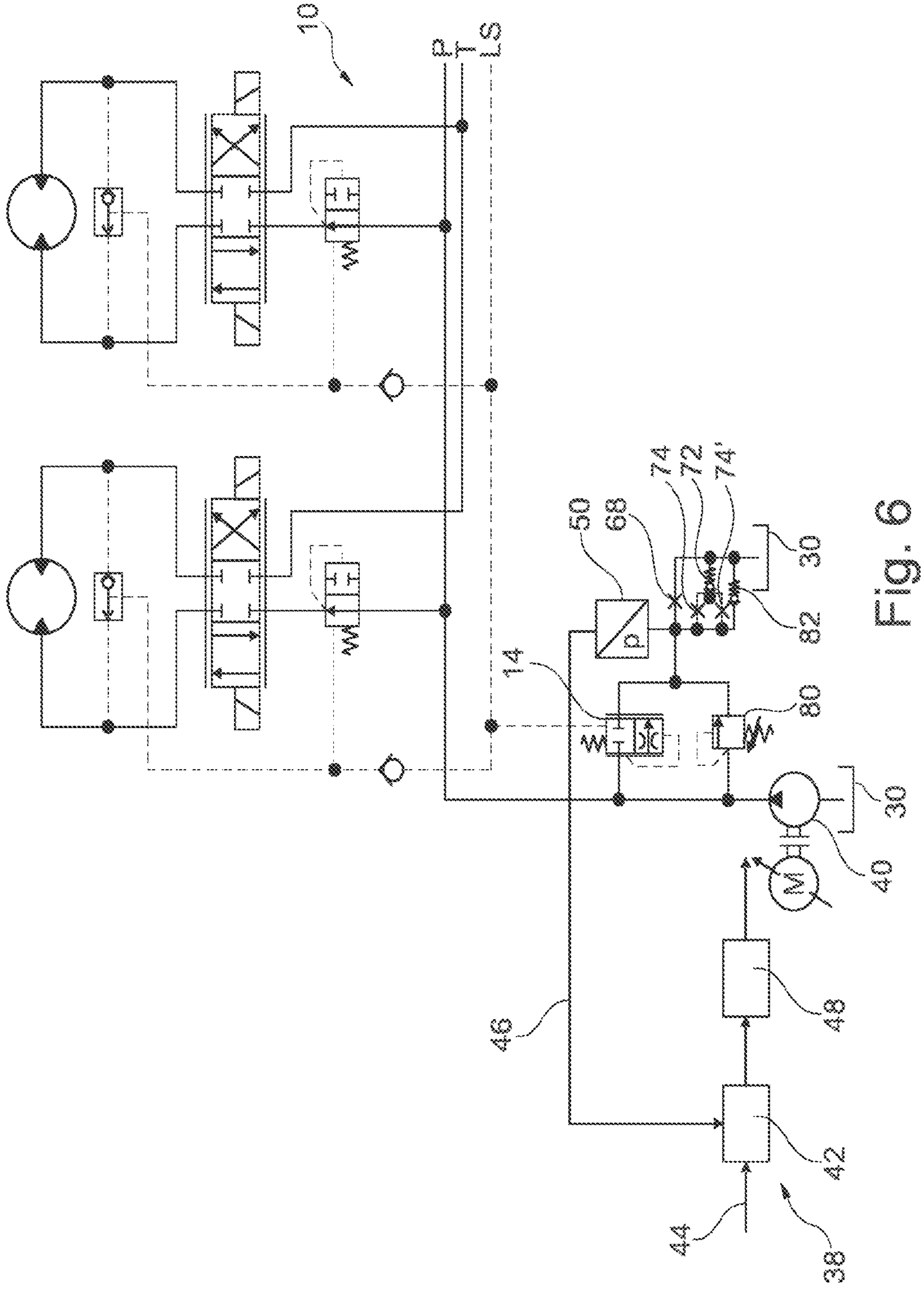

With regard to the volume flows and pressures to be controlled, if required, the further measuring orifice 74 comprising the non-return valve 72 can also be omitted. Likewise, according to the illustration shown in FIG. 6, based on comparable considerations, two parallel measuring orifices 74, 74' can be used, which together open in the direction of the non-return valve 72.

Figure 7:
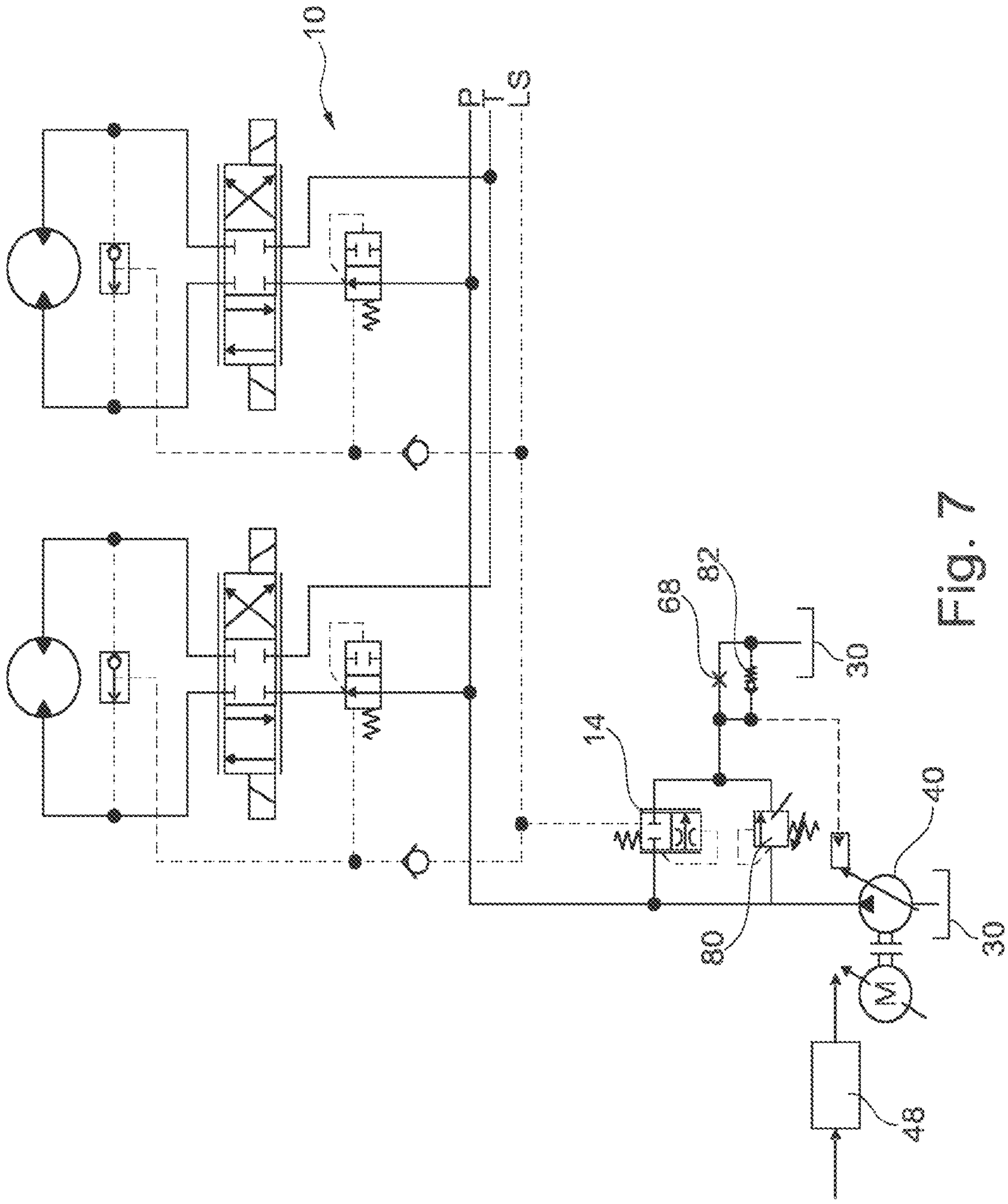

In the embodiment according to FIG. 7, a target speed is transmitted as an input variable to the motor control unit 48, which is, for example, formed by a typical frequency inverter. The motor control unit 48 then specifies, as a controlled variable, the respective speed for the motor M, and this time a variable displacement pump comprising a hydraulic/mechanical controller is used as the hydraulic pump 40, this being actuated by a pressure difference over the measuring orifice 68, which is returned hydraulically to the variable displacement pump. Such a pressure difference is tapped before the measuring orifice 68 and the non-return valve 82. The further measuring orifice 74 comprising the non-return valve 72 is omitted in this solution. Otherwise, this solution according to the circuit diagram illustration shown in FIG. 7 makes it possible to achieve the beneficial embodiments described above. Furthermore, the pressure sensor 50 or another sensor can be omitted.

Figure 8:
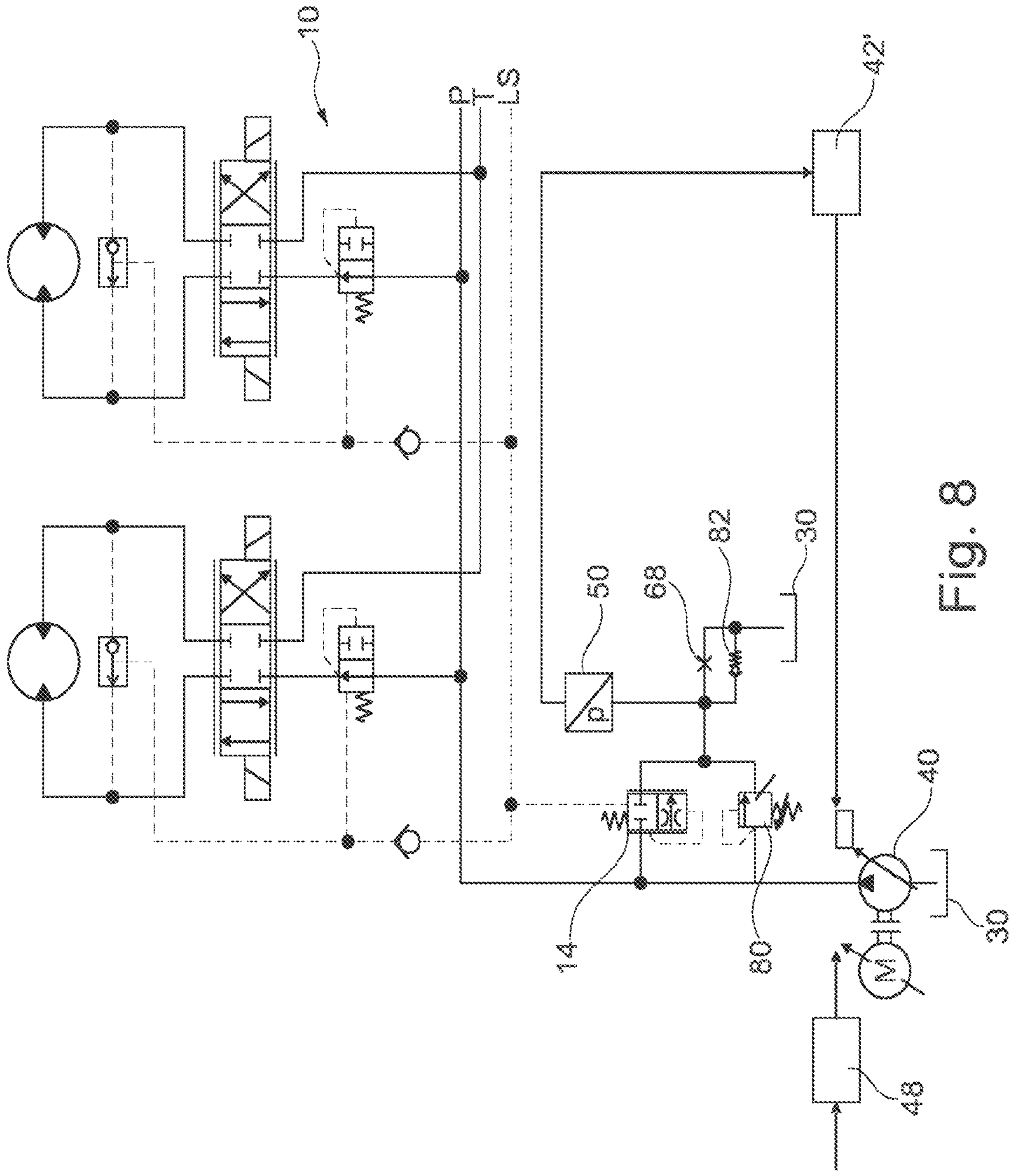

In the embodiment according to FIG. 8, a variable-speed unit having speed control is used. In this case, speed control of the unit takes place in parallel with control of the hydraulic pump 40 in the form of a variable displacement pump. In this case, speed control makes use of the controlled variable of the variable displacement pump controller, which is proportional to the adjustment angle, as the control variable (actual value) for a closed-loop control circuit. The controller adjusts the speed of the unit in such a way that, ideally, the control variable corresponds to a command variable (target value). This approach makes it possible to omit a sensor for acquiring the pivot angle of the variable displacement pump.

A variable displacement pump having electrical adjustment is a prerequisite, this in particular operating in an electrically-proportional manner. The regulator 42', like the regulator 42, is for example a PID controller, which obtains a command variable at the input side, and a control variable which originates on the output side from the pressure sensor 50. Then, for actuating the variable displacement pump, the regulator 42' emits, as the controlled variable, for example a current, which is proportional to the displacement angle of such a hydraulic pump 40.

Figure 9:
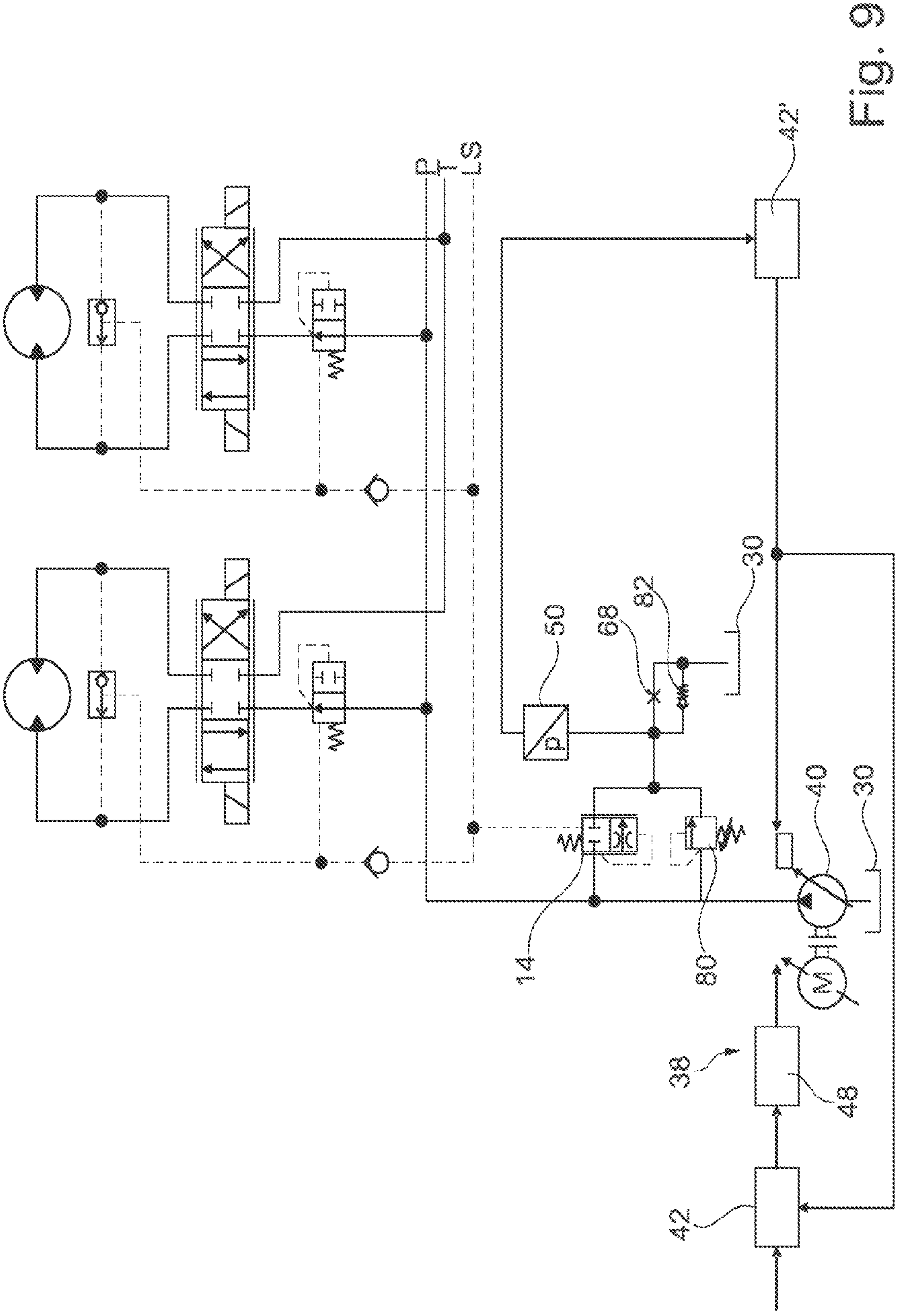

In the embodiment shown in FIG. 9, which largely corresponds to the solution shown in FIG. 8, the controlled variable of the regulator 42' is supplied as a control variable to the regulator 42 for the motor controller 38.

Figure 10:
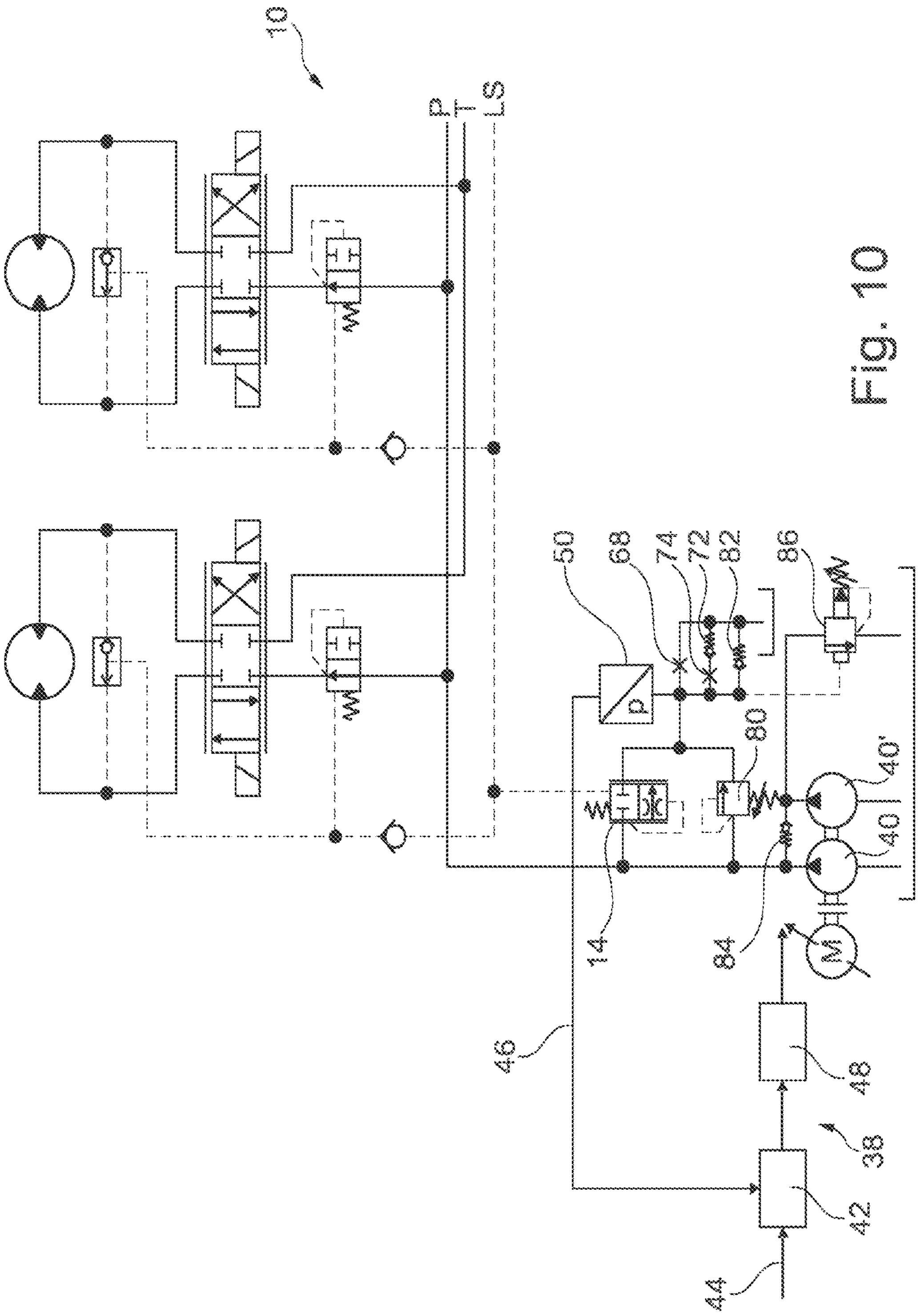

In the embodiment shown in FIG. 10, a unit comprising a dual pump is now used, both pumps 40, 40' delivering into the same system and at least one of the two pumps being separated from the system by a non-return valve 84. In the case of at least one of the hydraulic pumps, here the hydraulic pump 40', in addition a changeover valve 86 is arranged in front of the non-return valve 84, which blocks in the direction of the changeover valve 86. The pressure difference over the measuring orifice 68 or the measuring orifices 68, 74 is additionally returned to the changeover valve 86 as a hydraulic signal.

Figure 11:
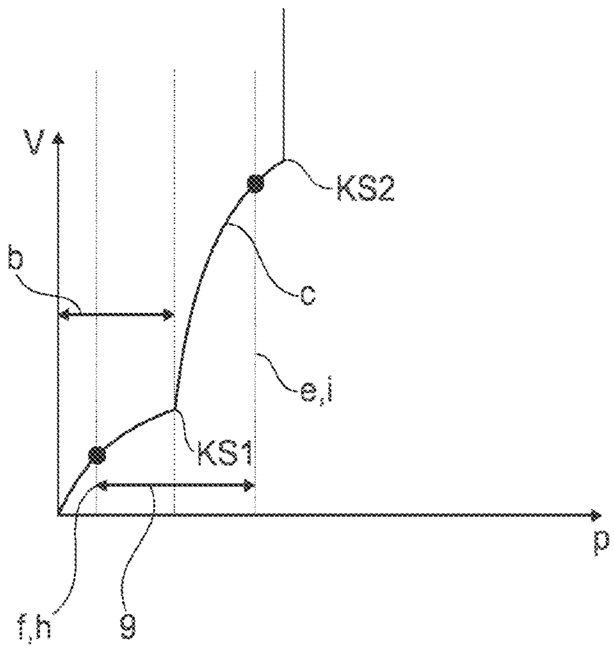

In this case, the changeover valve 86 has a control characteristic as shown in further detail in FIG. 11. In the event of a set pressure, as the upper setpoint e which can be specified mechanically or electrically, being exceeded, it connects one of the two pumps 40, 40' to a further, third pressure level which is below the system pressure; ideally, this pressure level corresponds to the tank pressure in the tank 30. Only if the pressure falls below a further pressure value, as the lower setpoint f, does the changeover valve 86 switch back and break the connection in the direction of the third pressure level (tank pressure). Correspondingly, the changeover valve 86 has, as shown in FIG. 11, a hysteresis g with respect to the opening and closing pressure. Speed control of the drive M for both hydraulic pumps 40, 40', in particular in the form of fixed displacement pumps, takes place in parallel.

The embodiment shown in FIG. 10 can also be modified in that the controller 38 for the motor M is omitted and the drive or motor M is operated at a fixed target speed (not shown).

Furthermore, it is possible, comparably to the solution shown in FIG. 7, to omit the controller 38 for the motor M and to specify exclusively one target speed for the motor control unit 48 in order to specify a speed as a controlled variable or input value.

Figure 12:
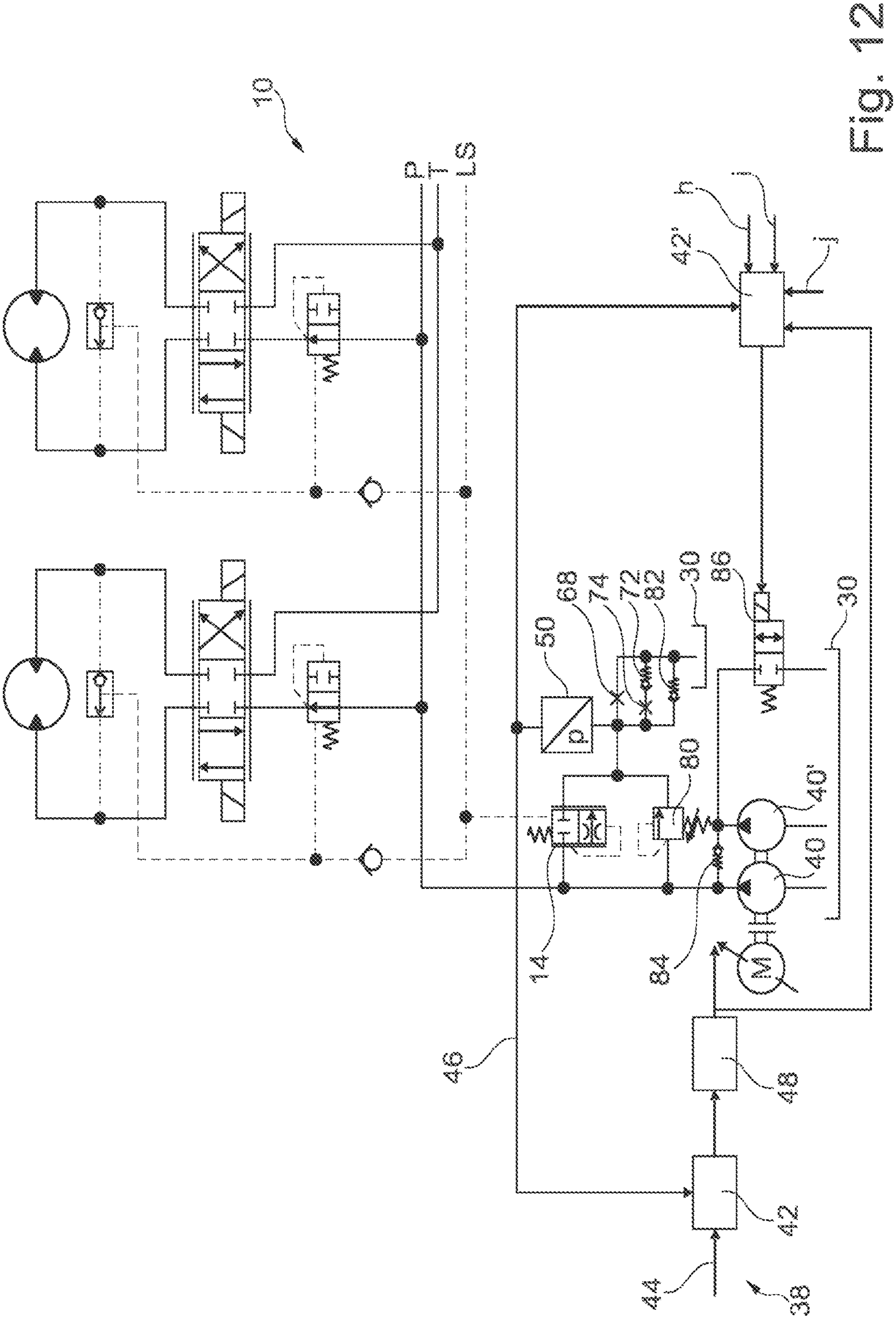

The embodiment shown in FIG. 12 has been changed compared with the solutions described above in that now the pressure difference over the measuring orifice 68 or the measuring orifices 68, 74 is acquired electronically by the pressure sensor 50, the signal of said sensor 50 being used for speed control of the drive in the form of the motor M, by means of the controller 38 described above. Furthermore, said sensor signal is used for electrically actuating the changeover valve 86.

In turn, a control device 42' is used for this purpose, which obtains the (pressure) condition 'switch on' h as the input variable, and the further (pressure) condition 'switch off' i. Furthermore, a (speed) condition 'switch off' j can be specified as the input condition. Further input variables originate from the output side of the pressure sensor 50, and furthermore the controlled variable (speed) on the output side of the frequency converter 48 is transmitted to the regulator 42', as the further input variable. The changeover valve 86 according to FIG. 12 is an electrically actuatable changeover valve having (which can also be achieved with normally open valves), a volume flow/pressure graph according to the illustration shown in FIG. 11 being created, having a hysteresis behaviour g, as shown. In this case, the lower setpoint f is to be equated with the (pressure) condition 'switch on' h, and the upper setpoint e corresponds to the (pressure) condition 'switch off' i. In this electrically actuated variant, hysteresis is achieved in the control device 42'.

The changeover valve 86 can be configured entirely differently, and in the present case is formed of an electromagnetically actuatable 2/2-way switching vale which is connected on the output side to the tank 30. However, all variants have in common the fact that, in the event of the pressure falling below a pressure value h, the changeover valve 86 is in a position in which there is no connection to a pressure level below the system pressure (pressure of the further pump stage). In contrast, in the event of a further pressure value i being exceeded, the changeover valve 86 establishes a connection to a further pressure level, which is below the system pressure and ideally corresponds to the tank pressure. Furthermore, it is possible, but not essential, for this process to also be coupled to a further condition, for example a speed condition j. Speed control for the drive M takes place in parallel, or the unit M can again be operated at a constant speed.

In any case, all solutions have in common the fact that a simple, cost-effective, robust and requirement-oriented volume flow supply for closed sensor systems is achieved, and that the solution provides a volume flow supply of fluid when required, a possible surplus volume flow via the circulation pressure balance 14 and the associated losses being reduced to a necessary minimum. The invention has been described in the preceding using various example embodiments. Other variations to the disclosed embodiments may be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, device, or other unit may be arranged to fulfil the functions of several items recited in the claims. Likewise, multiple processors, devices, or other units may be arranged to fulfil the functions of several items recited in the claims.

The term "exemplary" used throughout the specification means "serving as an example, instance, or exemplification" and does not mean "preferred" or "having advantages" over other embodiments. The terms "in particular" and "particularly" used throughout the specification means "for example" or "for instance".

The mere fact that certain measures are recited in mutually different dependent claims or embodiments does not indicate that a combination of these measures cannot be used to advantage. Any reference signs in the claims should not be construed as limiting the scope.

What is claimed is:

1. A volume flow supply, comprising a pressure supply device and a pressure compensator as components of a supply system for supplying fluid to a hydraulic consumer which can be connected thereto, wherein the pressure supply device provides a volume flow when required in order to supply the hydraulic consumer;

wherein the pressure compensator is made of a bypass pressure regulator valve which discharges a surplus volume flow out of the volume flow;

the volume flow supply further comprising a controller which reduces the surplus volume flow to a minimum by actuating the pressure supply device; wherein an outlet side of the bypass pressure regulator valve adjoins at least one measuring orifice; and wherein at least one further measuring orifice and/or a check valve is connected in parallel with the one measuring orifice.

2. The volume flow supply of claim 1, wherein the pressure supply device comprises at least one hydraulic pump which is driven by a motor that is actuated by the controller.

3. A method for carrying out a volume flow supply when required, comprising the device of claim 2, wherein, using a respective pressure and/or path sensor, a control variable for a closed control circuit is acquired, which adjusts a drive speed for the at least one hydraulic pump in such a way that the control variable corresponds to a command variable of a regulator, so that just enough of the volume flow is available such that the supply system is kept stable and a hydraulic loss is reduced.

4. The method of claim 3, wherein the controller comprises the regulator having a specifiable command variable, the control variable of which is formed by output values of a sensor which, configured as a pressure sensor, acquires pressure values on the outlet side of the bypass pressure regulator valve, and/or, configured as a path sensor, acquires a movement position of a valve slider of the bypass pressure regulator valve.

5. The method of claim 3, wherein an output of the regulator is connected to a motor control unit.

6. The method of claim 3, wherein the volume flow supply further comprises a motor control unit, the motor control unit comprises a frequency inverter, which sets a speed of the motor as an electric motor that drives the at least one hydraulic pump.

7. The method of claim 3, wherein the bypass pressure regulator valve is configured in a slide construction as a directly controlled, spring-loaded throttle valve, a valve slider of which is subjected on one side, together with an energy accumulator to an LS pressure, by the hydraulic consumer, and on another side is subjected to a control pressure which corresponds to a output or a supply pressure of the pressure supply device.

8. The volume flow supply of claim 1, wherein the controller comprises a regulator having a specifiable command variable, a control variable of which is formed by output values of a sensor which, configured as a pressure sensor, acquires pressure values on an outlet side of the bypass pressure regulator valve, and/or, configured as a path sensor, acquires a movement position of a valve slider of the bypass pressure regulator valve.

9. The volume flow supply of claim 8, wherein an output of the regulator is connected to a motor control unit.

10. The volume flow supply of claim 9, wherein the motor control unit comprises a frequency inverter, which sets a speed of an electric motor that drives a hydraulic pump, wherein the pressure supply device comprises the electric motor and the hydraulic pump.

11. The volume flow supply of claim 1, wherein the bypass pressure regulator valve is configured in a slide construction as a directly controlled, spring-loaded throttle valve, a valve slider of which is subjected on one side, together with an energy accumulator to an LS pressure, by the hydraulic consumer, and on another side is subjected to a control pressure which corresponds to an output or supply pressure of a pressure supply device.

12. The volume flow supply of claim 1, configured for a closed center LS system.

13. The volume flow supply of claim 1, wherein the at least one further measuring orifice is connected in front of the-a non-return valve, viewed in the flow direction.

14. The volume flow supply of claim 1, wherein a free cross-section of the further measuring orifice is larger than that of the at least one measuring orifice.

15. The volume flow supply of claim 1, wherein a bypass line is present, connected in parallel with said measuring orifice.

16. The volume flow supply of claim 15, wherein the bypass line comprises at least one spring-loaded non-return valve which opens in the direction of a tank or return line.

* * * * *